United States Patent [19]

Sawyer

[11] 4,024,795
[45] May 24, 1977

[54] VEHICLE BRAKE ACTUATING SYSTEMS

[75] Inventor: Patrick Frank Sawyer, Birmingham, England

[73] Assignee: Girling Limited, Birmingham, England

[22] Filed: Oct. 31, 1975

[21] Appl. No.: 627,838

[30] Foreign Application Priority Data
Nov. 8, 1974 United Kingdom ............ 48509/74

[52] U.S. Cl. .................................. 91/384; 91/377; 91/391 R

[51] Int. Cl.² ...................... F15B 9/10; F15B 13/10

[58] Field of Search ............. 91/377, 391 R, 391 A, 91/368, 384

[56] References Cited
UNITED STATES PATENTS

| 2,905,152 | 9/1959 | Ingres | 91/377 |
| 2,934,042 | 4/1960 | Stelzer | 91/377 |
| 3,075,502 | 1/1963 | Sadler | 91/377 |

*Primary Examiner*—Paul E. Maslousky

*Attorney, Agent, or Firm*—Scrivener Parker Scrivener & Clarke

[57] ABSTRACT

A power assisted pedal assembly comprises a brake pedal pivotally connected at one end to a lever which is pivotal about a fixed point, the brake pedal having a connection intermediate its ends with an actuating member of a master cylinder to apply an operating force to the actuating member, and a power assistor operable in response to movement of the brake pedal to apply an assisting force to the brake pedal. The power assistor has a force-transmitting member which is separate from the actuating member and which is in force-transmitting engagement with the lever on or close to the line of action of the force applied to the actuating member by the brake pedal. The brake pedal and the lever pivot about the fixed point when the power assistor is operative and the pedal pivots about a point intermediate the fixed point and the connection between the lever and the actuating member upon failure of the power assistor.

13 Claims, 3 Drawing Figures

VEHICLE BRAKE ACTUATING SYSTEMS

This invention relates generally to vehicle brake actuating systems and particularly to power assisted pedal assemblies for use with master cylinders of such systems.

The pedal ratio which is suitable for normal power assisted operation of the master cylinder may not be suitable if the power assistance fails, because the user may be incapable of producing the force required to operate the master cylinder without the power assistance. For this reason it is known to arrange for the pedal ratio to be different in the failed condition of the power assistance so that the user can apply the desired operating force to the master cylinder, but with a greater pedal travel being required.

In previously proposed actuating systems the brake pedal is pivotally mounted at its upper end on a lever pivotable about a fixed pivot, the pedal having a connection intermediate its ends with an actuating member of a master cylinder. The pedal is movable relative to the lever through a small distance during initial operation and that movement is sufficient to actuate a power assistor or "booster" which is connected to the lever. The force of the power assistor is transmitted through the lever to the brake pedal to assist the manually applied force. Further movement of the brake pedal is about the fixed pivot, the position of which determines the pedal ratio. In the event of failure of the power assistor, the brake pedal, pivots about a point of engagement between the lever and the brake pedal, which point is spaced from the fixed pivot to provide a different pedal ratio permitting the brake to be applied manually, but with a greater pedal travel than the power assistor operating normally.

In the previously proposed system the power assistor is mounted with the master cylinder on the engine side of a partition dividing the engine compartment from the passenger compartment, so that either the lever or an actuating rod of the power assistor projects through the partition with a result that a special hole has to be made in the partition to receive the lever or actuating rod. Furthermore, the connection between the power assistor and the lever is spaced a considerable distance from the connection between the lever and the actuating member of the master cylinder so that the end of the lever connected to the power assistor undergoes a considerable arc of movement. The hole in the partition has to be large to accommodate such movement and has to be sealed by a suitable sealing boot.

In accordance with the present invention there is provided a power assisted pedal assembly comprising a brake pedal pivotally connected at one end to a lever which is pivotal about a fixed point, the brake pedal having a connection intermediate its ends with an actuating member of a master cylinder to apply an operating force to the actuating member, and a power assisting means operable in response to movement of the brake pedal to apply an assisting force to the brake pedal, the power assisting means having a force-transmitting member which is separate from the actuating member and which is in force transmitting engagement with the lever on or close to the line of action of the force applied to the actuating member by the brake pedal, wherein the brake pedal and the lever pivot about the fixed point when the power assisting means is operative, the pedal pivoting about a point intermediate the fixed point and the connection between the lever and the actuating member upon failure of the power assisting means.

Preferably, the point of engagement of the force-transmitting member with brake pedal is rearwardly of the brake pedal on the opposite side thereof to the master cylinder.

The point of engagement between the force assisting means and the pedal may be in line with the line of action of the force applied to the actuating member, in which case the power assisting means may be so located that the line of action of the power assisting force applied to the pedal is coincident with the line of action of the force applied to the actuating member.

The power assisting means may be located either forwardly or rearwardly of the brake pedal so that either a power assisting "push" or "pull" is provided.

In normal operation the brake pedal and lever pivot about the fixed pivot, but upon failure of the power assistor the pedal pivots about a point intermediate the fixed pivot and the connection of the lever with the actuating member, so that the pedal travel ratio changes.

Two forms of brake actuating system including a power assisted brake pedal assembly in accordance with the invention operating a master cylinder will now be described, by way of example, with reference to the accompanying drawings, in which.

Figure 1:
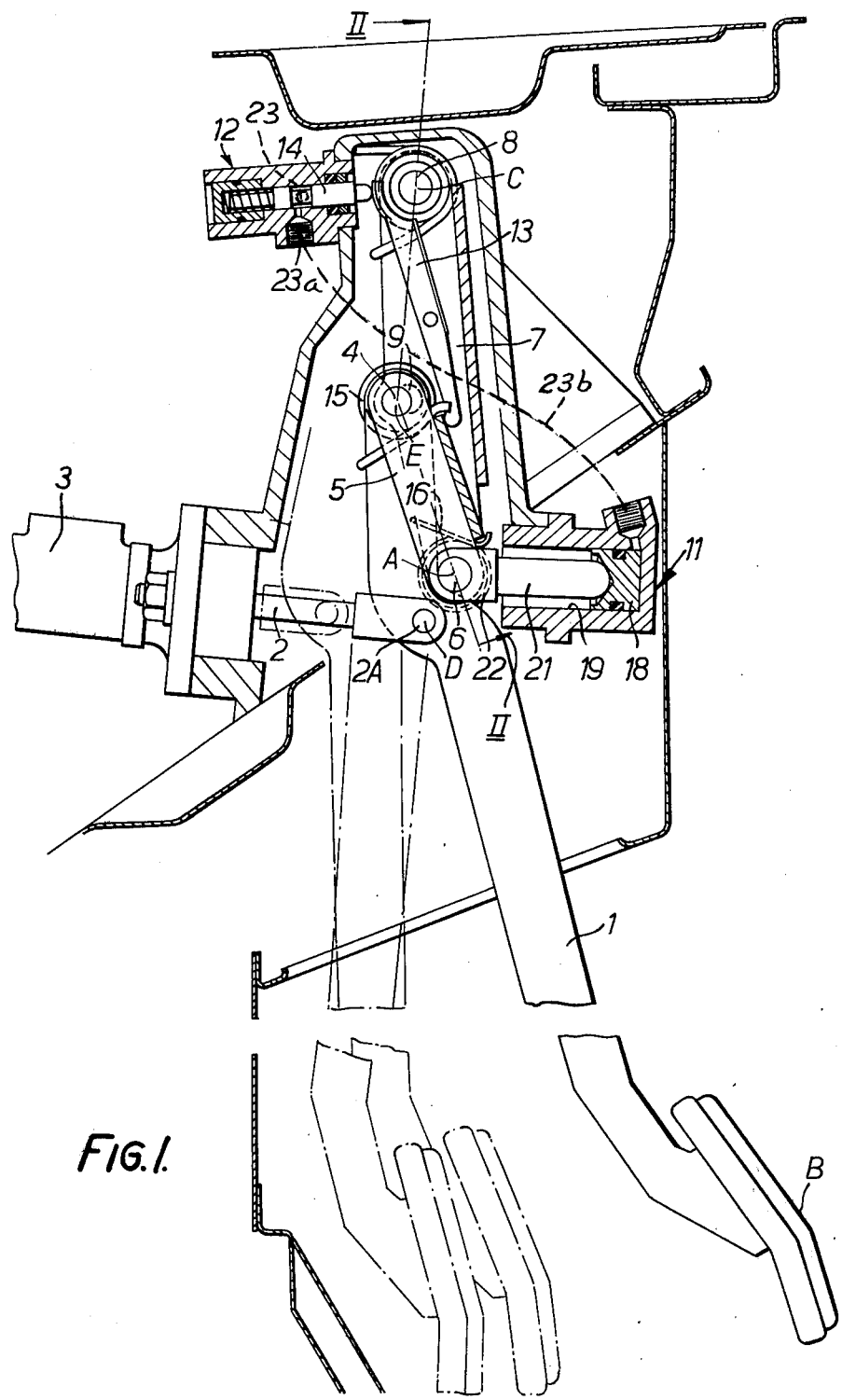
FIG. 1 is a cross-sectional view of one embodiment of the system.

Both embodiments comprise a brake pedal 1 pivotally connected intermediate its ends by a pin 2A having an axis D, to an actuating member 2 movable to operate a master cylinder 3. The pedal 1 is pivotally connected at its upper end by a pivot pin 4 to one end of an intermediate link 5, the other end of link 5 being in turn pivotally connected by a pin 6 to the lower end of a downwardly depending lever 7 pivotally mounted on a fixed pin 8. The pin 4 connecting the pedal to the intermediate link 5 passes through a slot 9 in the depending lever 7 to permit a small amount of relative movement of the intermediate link relative to the lever about the axis A of pin 6. As can be seen more clearly in FIG. 2 the intermediate link 5 and lever 7 are of channel cross-section.

Power assisting means are provided to assist the manual force applied to the lower end of the brake pedal during brake application, the power assisting means comprising a fluid-pressure operated assistor 11 operation of which is controlled by a valve 12 actuated in response to movement of the brake pedal by a valve-operating lever 13 pivotally mounted on the depending lever 7 and engaging at its upper end a valve stem 14 and at its lower end the intermediate link 5.

Torsion springs 15 and 16 surround the pins 4 and 6 respectively, the spring 15 biasing the intermediate link 5 and pedal 1 towards each other so that the pin 6 engages the pedal 1 in the inoperative position illustrated, and spring 16 biases the link 5 and lever 7 apart so that the pin 4 adopts the illustrated position relative to the slot 9 in the inoperative condition.

Figure 2:
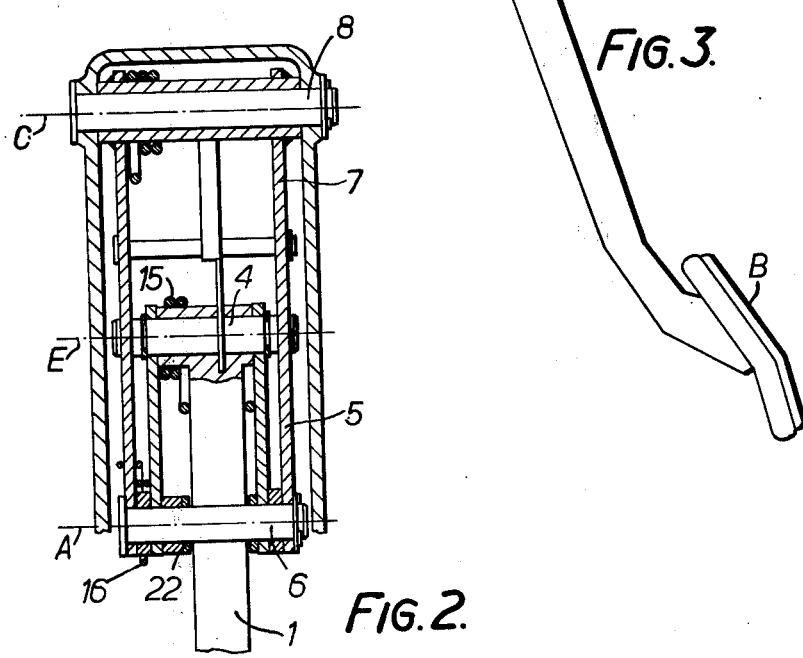
FIG. 2 is a section taken along the lines II—II in FIG. 1.

Referring now particularly to the embodiments of FIGS. 1 and 2 the power assistor comprises a piston 18 working in a cylinder 19 and having a piston rod 21 extending from the cylinder, the outer end of the rod having a bifurcated portion 22 through which the pin 6 passes. The valve 12 is a spool valve having an inlet 23 connected to a high pressure source and an outlet 23a connected to the cylinder 19 as indicated by the dotted line 23b. The valve spool constitutes the valve stem 14 referred to above.

Operation of the actuating system will now be described. When foot pressure is applied to the pedal 1, say at point B the pedal pivots initially about the axis A of pin 6 since the springs 15 and 16 are so chosen that the latter is overcome first to permit movement of the intermediate link 5 and the lever 7 towards each other and thereby permit movement of the pin 4 along the slot 9. This rearward movement of the link 5 rocks the valve-operating lever 13 to operate the spool valve to pressurize the cylinder 19, thus providing a force acting through the piston rod 21 on the pedal 1 to augment the manually applied force. During further movement the pedal 1 and the lever 7 pivot about the axis C of pin 8. The assisting force and the manually applied force both act through the actuating member 2 to operate the master cylinder 3.

Movement of the lever 7 under the action of the power assistor 11 tends to move the intermediate link 5 forwardly in the slot 9 permitting rotation of the valve-operating lever 13 to cut off the valve. In this way a balance is set up between the operation of the power assistor to move the lever 7 and pedal 1 about the axis C and the tendency of such movement to cut off the power assistor, so that the position of the brake pedal 1 is dependent on the manual force applied to the pedal and the force applied to the actuating member 2 is proportional to that applied by the operator, but augmented by the power assisting means. During normal operation there are two operating ratios; namely the pedal load ratio which is the ratio of BD to DA and the pedal travel ratio which is BD to DC.

If the power assisting means should fail, no force is applied to the pedal 1 through the piston rod 21. Initially the brake pedal moves as in the normal operation and pivots about axis A while the pin 4 moves along slot 9, after which the pedal pivots about the axis E of pin 4, only the manually applied force being transmitted through the actuating member 2. The depending lever 7 is held in its illustrated position by the reaction on the pivot pin 4. In this case the pedal travel ratio and the pedal load ratio are the same and are the ratios BD to DE.

Figure 3:
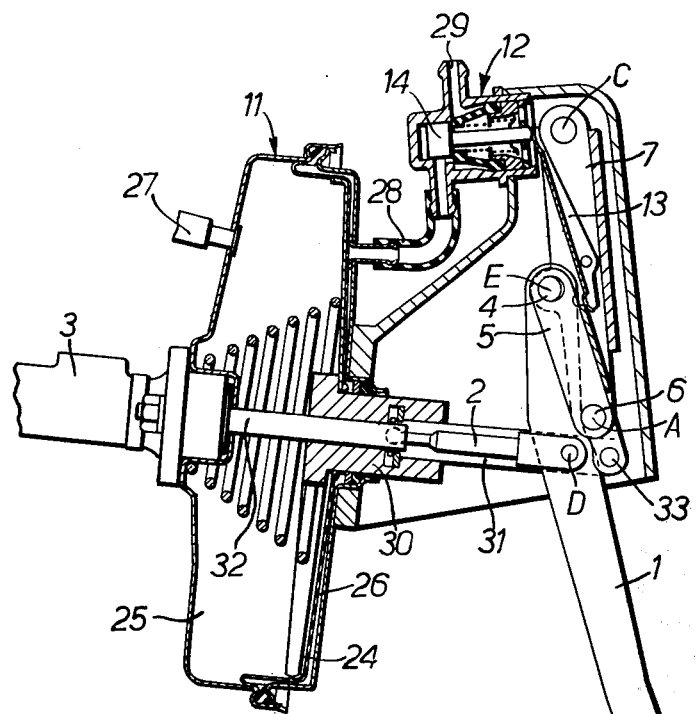
FIG. 3 is a sectional view similar to that of FIG. 1, but of a second embodiment.

The embodiment of FIG. 3 is generally similar to that of FIGS. 1 and 2, the main difference being that the power assistor 11 is located between the brake pedal 1 and the master cylinder 3 so that the assisting force is a "pull" on the brake pedal 1. The power assistor 11 comprises a diaphragm 24 separating a pair of chambers 25, 26 the left hand chamber 25 being connected through an inlet 27 to a vacuum source, which may be on the induction system of the vehicle's engine, and the right hand chamber 26 being connected through a conduit 28 to the outlet of the valve 12. The valve has an inlet 29 connected to the vacuum supply. Normally the chamber 26 is subjected to vacuum, but upon rotation of the valve operating lever 13, the valve stem 14 is moved to introduce atmospheric air through the valve into the chamber 26, a pressure differential being set up across the diaphragm 24 which moves to the left. Connected to the diaphragm 24 through a central boss 30 are a pair of spaced links 31 which are pivotally connected to the lower end of the depending lever 7 by a pivot pin 33. The actuating member 2 is, in this embodiment, slidable relative to the links 31 and located therebetween and connected to a member 32 which is slidable through the central boss 30.

For clarity the springs 15 and 16 have been omitted from FIG. 3, although in practice they are present.

Operation of this system is generally the same as that of FIG. 1 except that the assisting force is applied to the brake pedal through the links 31 and the pin 33.

In both of the above described embodiments, the depending lever 7 extends generally parallel to the brake lever 1 and effectively forms an extension thereof, so that the minimum of lateral space is required to accommodate the lever system. Furthermore, the lever 7 is connected to the power assistor 11 close to or on the line of action of the force applied to the actuating member.

The embodiment of FIG. 3 has the further advantage that the connection between the lever 7 and the power assistor is in line with the actuating member 2 so that the power assistor 11 and the master cylinder 3 can be in line and existing brake actuating systems can be easily modified to accommodate the actuating system.

I claim:

1. A power assisted pedal assembly comprising a lever pivotable about a fixed point, a brake pedal, a link having a first pivotal connection at one end with said lever and a second pivotal connection at the other end with said brake pedal, an actuating member adapted for connection to brake operating means and having a connection with said brake pedal intermediate the ends of said brake pedal whereby said brake pedal can apply a force to said actuating member along a predetermined line of action, and a power assisting means operable in response to movement of said brake pedal to apply an assisting force to said brake pedal said power assisting means having a force-transmitting member which is separate from said actuating member and which is in force-transmitting engagement with said lever and said link in the region of said line of action of the force applied to said actuating member by said brake pedal and so that said brake pedal, link and lever pivot about said fixed point when said power assisting means is operative, said pedal having a second pivot point intermediate said fixed point and said connection between said lever and said actuating member and means causing said pedal to pivot about said second point upon failure of said power assisting means.

2. A pedal assembly according to claim 1, wherein said second pivot point intermediate said fixed point and said connection between said lever and said actuating member is constituted by said second pivotal connection of said link with said brake pedal.

3. A pedal assembly according to claim 1, wherein said force-transmitting means has a connection with said lever in the region of said connection between said actuating member and said brake pedal.

4. A pedal assembly according to claim 1, wherein said actuating member and said force-transmitting member have coincident axes.

5. A pedal assembly according to claim 1, wherein said force-transmitting member is parallel with said actuating member.

6. A pedal assembly according to claim 1, including first biasing means which bias said link and said pedal towards each other in the region of their said connection and second biasing means which bias said link and lever away from each other in the region of their said connection.

7. A pedal assembly according to claim 1, including an operating member which is movable to actuate said power assisting means, wherein said operating member is engaged by said link and operated in response to movement of said link relative to said lever.

8. A pedal assembly according to claim 7, including means permitting a small degree of initial movement of said pedal and said link relative to said lever, said initial movement of said link actuating the power assisting means.

9. A pedal assembly according to claim 1, wherein said force-transmitting member engages said brake pedal rearwardly of said pedal.

10. A pedal assembly according to claim 1, wherein said power assisting means is connected to said lever at said connection of said link with said lever, whereby said power assisting means acts on said brake pedal in the region of that connection.

11. A pedal assembly according to claim 1, wherein said power assisting means is located rearwardly of said brake pedal.

12. A pedal assembly according to claim 1, wherein said power assisting means is connected to the lower end of said lever.

13. A pedal assembly according to claim 1, wherein said power assisting means is located on the same side of said brake pedal as said brake actuating means.

* * * * *